United States Patent
Itskov

(12) 
(10) Patent No.: US 6,692,361 B1
(45) Date of Patent: Feb. 17, 2004

(54) VIDEO GAME TERMINAL

(75) Inventor: Boris Itskov, Thornhill (CA)

(73) Assignee: JVL Corporation, Concord (CA)

( * ) Notice: Subject to any disclaimer, the term of this patent is extended or adjusted under 35 U.S.C. 154(b) by 8 days.

(21) Appl. No.: 09/604,808

(22) Filed: Jun. 28, 2000

(51) Int. Cl.⁷ .................................................. A63F 9/24
(52) U.S. Cl. ........................................... 463/43; 463/29
(58) Field of Search .............................. 463/1, 25, 29, 463/43–44; 700/91, 100; 725/1, 2, 9

(56) References Cited

U.S. PATENT DOCUMENTS 5,634,848 A  *  6/1997  Tsuda
5,828,862 A  *  10/1998  Singkornrat ................. 463/44

* cited by examiner

*Primary Examiner*—Mark Sager

(57) ABSTRACT

A coin operated game terminal is provided with additionally flash memory for effective additional storage of games provided on a separate mass storage arrangement. This additional flash memory allows operation of the game terminal in a restricted mode if the separate mass storage arrangement fails. The flash memory is also used to store determined popular games to reduce delays in loading of the games.

17 Claims, 3 Drawing Sheets

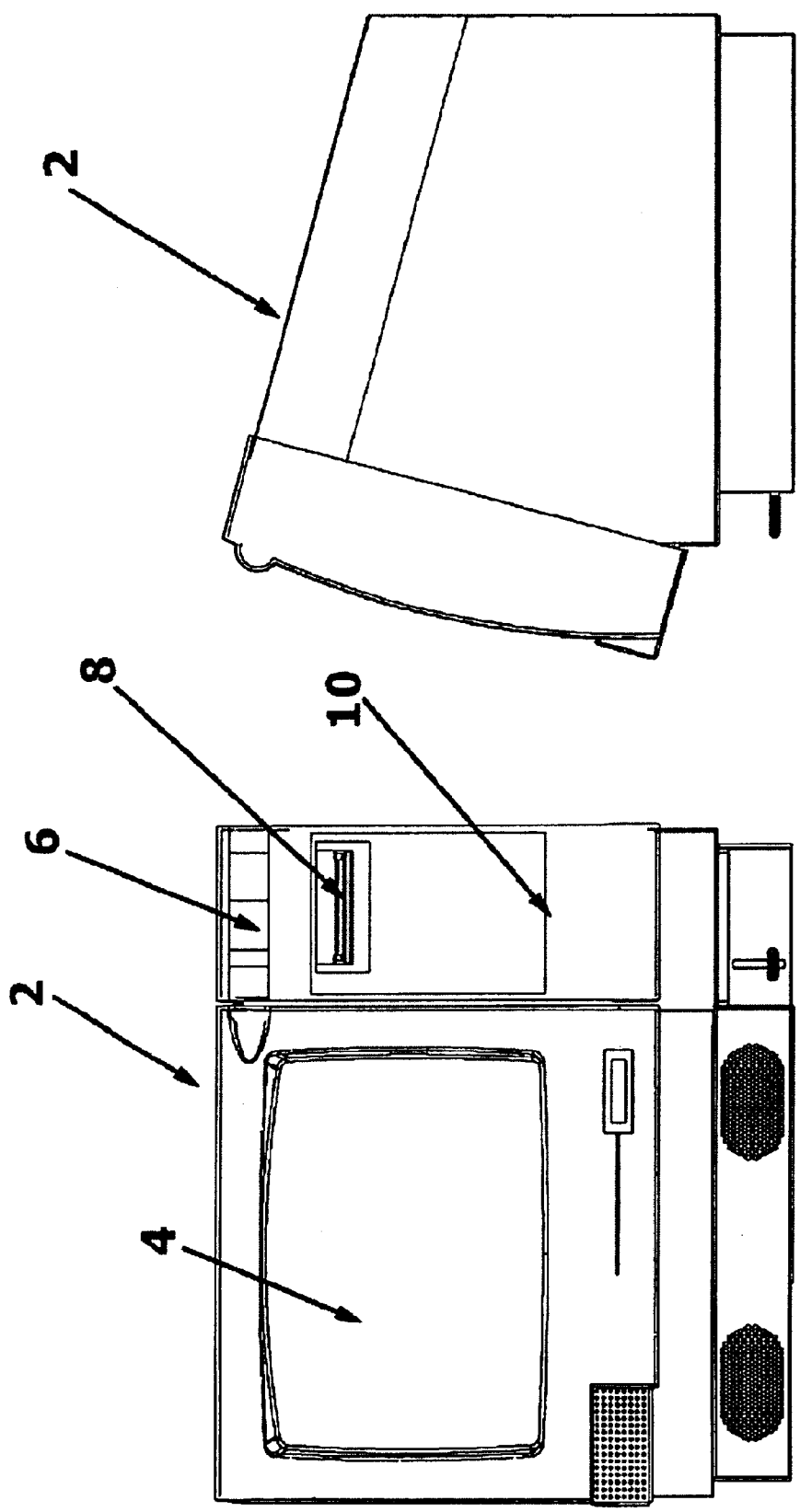

VIDEO GAME TERMINAL

BACKGROUND OF THE INVENTION

The present invention relates to video game terminals for commercial establishments and an improved game storage arrangement.

In commercial establishments, video game terminals are typically coin operated or include a validator for payment. The terminals preferably have a host of video games and puzzles that can be played by one or more patrons. Somewhat surprisingly, there is substantial variation in the most popular games that varies from location to location.

Most game terminals have at least 20 different video games available and some game terminals have 60 or more games that are immediately available. Such game terminals are relatively sophisticated using a processing arrangement similar to a personal computer to provide the fast processing necessary for the operation of the game and the changing video graphics. In recent years, the amount of memory required by certain games has greatly increased.

With these video game terminals, the computer processing arrangement can access several different types of mass storage memory. In particular, hard disk drives have been used to store the host of games available on these terminals, and in some cases, CD drives are used to store the games and in particular, the video graphics of the games.

The video game terminal has an operating system which displays various screens to encourage a patron to participate, and this participation normally includes the payment of a fee as well as the indication of a particular game to be played. Upon receiving these instructions, the processor accesses the mass storage device and loads the game or part thereof into Random Access Memory (RAM) associated with the processor. In some cases, the entire game can be loaded into RAM whereas in other cases, only portions of the game are loaded into RAM and the remaining information is available on the hard disk, CD drive or other mass storage arrangement.

The accessing of CD drives is somewhat slower than accessing hard disk drives, however, a CD drive makes it convenient for the operator to upgrade games when required. For example, compact disks can be sent in the mail and the owner can update the games by inserting the CD into the CD drive, and the game terminal is then updated, based on the new CD.

The process to upgrade a hard drive is more difficult and typically requires a skilled technician to at least access particular ports on the video game terminal and download the particular information to the game terminal. This is time consuming and has a higher update cost, relative to updating, based on a compact disk.

CD drives, as well as DVD drives and hard disk drives all rely on a mechanical drive arrangement which is subject to failure. As can be appreciated, these game terminals operate essentially seven days a week and may be subject to some abuse. Assuming the actual site conditions are satisfactory, these drives do have an expected life, and some failures will occur.

In most cases when a failure occurs, it is necessary to contact the owner of the machine and arrange for a technician to attend on site to repair or replace the terminal. There can also be a substantial period of time when the game terminal is not available due to the scheduling of the technician. This downtime is immediately reflected in a loss of revenue which is not restricted to the game terminal alone. These game terminals encourage patrons to attend a particular bar to play certain games, and purchase their favourite beverages.

It is therefore desirable to provide a reliable game terminal, as well as a video game terminal which can be upgraded easily. It is also desirable to be able to have a mass storage device which is capable of storing many games.

SUMMARY OF THE INVENTION

A coin operated device, according to the present invention, comprises a computer processing arrangement which includes a computer processor circuit board with its own RAM (Random Access Memory) for running any game of a series of games. The game device includes a first mass storage device selected from the group of a hard disk drive, a compact disk drive and a DVD drive, and a second mass storage device in the form of a flash memory device with a capacity of at least 10 mega-bytes. Each mass storage device stores a series of games, and cooperate with the computer processor for running of the games. The computer processor includes memory means for tracking of the individual games played, allowing identification of the more popular games played. The computer processor causes the identified more popular games to be stored in the flash memory device for recall.

According to a preferred aspect of the invention, the coin operated game device has at least 30 games.

According to a further aspect of the invention, the computer processor manages the storage of games to the flash memory, at least partially based on the popularity of the games, whereby frequently played popular games are stored in flash memory, when practical.

A coin operated game device, according to the present invention, has a main processing arrangement for playing any of 10 or more games stored in a separate flash memory arrangement or in a separate different type of memory storage arrangement. The processing arrangement maintains statistics with respect to the individual games played, to determine popular games, and additionally stores popular games when practical in said flash memory arrangement.

According to a further aspect of the invention, the coin operated device has the processing arrangement operating in a particular manner. The processing arrangement, in the event of failure of either the flash memory or the different type of memory arrangement, operates the game device in a restricted mode, using the remaining operating memory arrangement.

According to yet a further aspect of the invention, the different type of memory arrangement includes a compact disk or a DVD drive arrangement. The processing arrangement in the event of failure of the different type of memory, operates the game device in a restricted mode, based on the games available in the flash memory.

According to yet a further aspect of the invention, the coin operated game device monitors the mass memory storage arrangements and disables any games which are not available due to a failure of one of the mass storage arrangements, and only presents available video games for selection by the user.

An operating system for a pay-to-play video game device, according to the present invention, coordinates the storage of the games to be played on the device and transfers some of the games from a CD memory arrangement or DVD memory arrangement to a flash memory arrangement capable of storing several different games. The operating system further includes a monitoring function which determines whether each of the memory arrangements is functional, and in the event of one of the memory arrangements not being functional, the operating system restricts the operation of the video game while maintaining the video device operational for a limited number of games available on the functioning memory arrangement.

BRIEF DESCRIPTION OF THE DRAWINGS

Preferred embodiments of the invention are shown in the drawings, wherein:

FIG. 1 is a front view of a video game terminal;

FIG. 2 is a side view of the video game terminal;

DETAILED DESCRIPTION OF THE PREFERRED EMBODIMENTS

Figure 3:
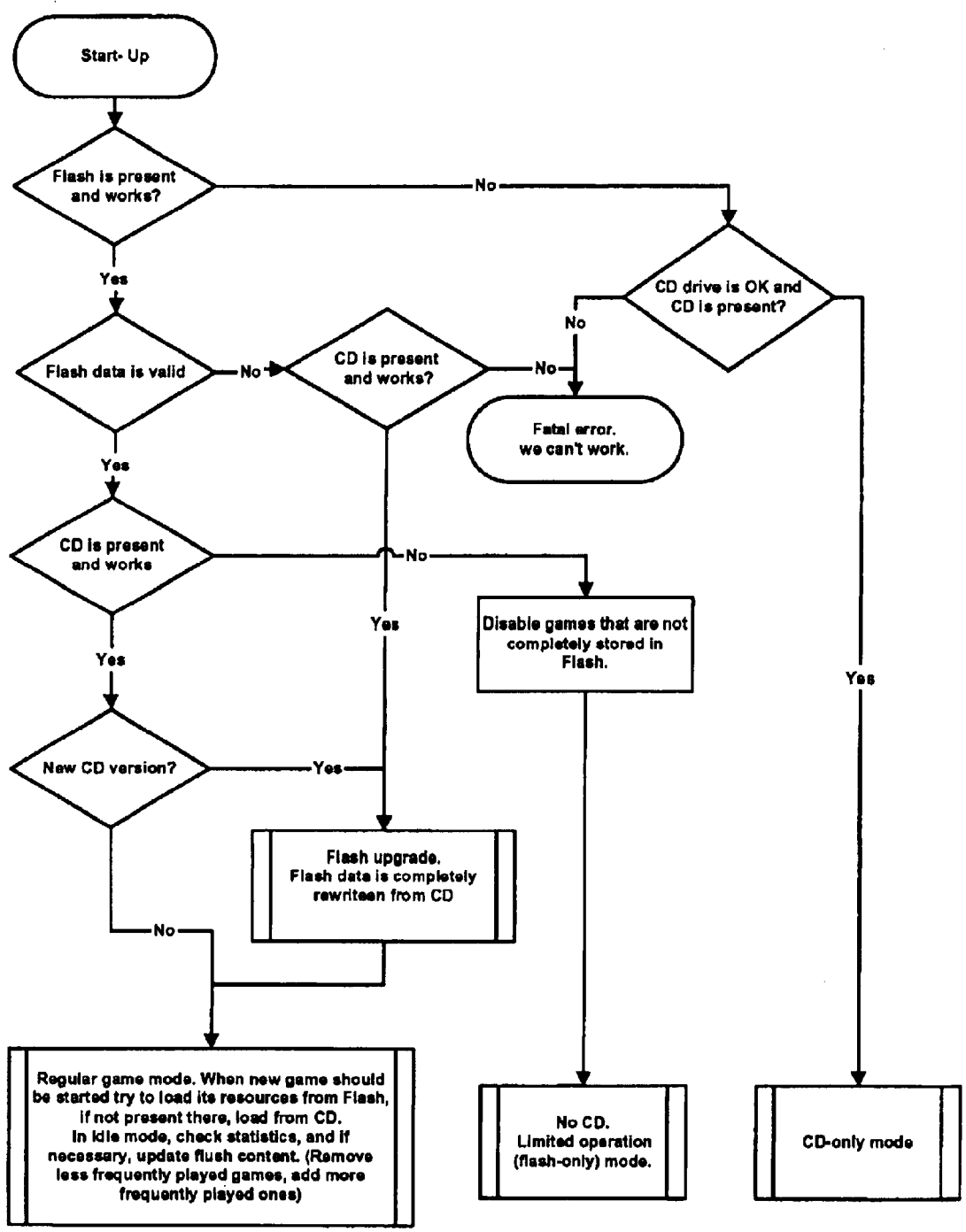
FIG. 3 is a flow chart showing the operation sequence of the game terminal.

The video game terminal 2 shown in FIG. 1 and FIG. 2 has a video touch screen 4 which allows the user to select the particular game and to interact in the game mode. The game terminal includes a coin acceptor 6 and a bill acceptor 8 for effecting payment to commence a game or series of games. The game terminal includes a CD drive 10 for receiving of a CD (compact disk) of the games available to be played. This CD drive could be a DVD drive or other cartridge type mass storage drive.

Figure 4:
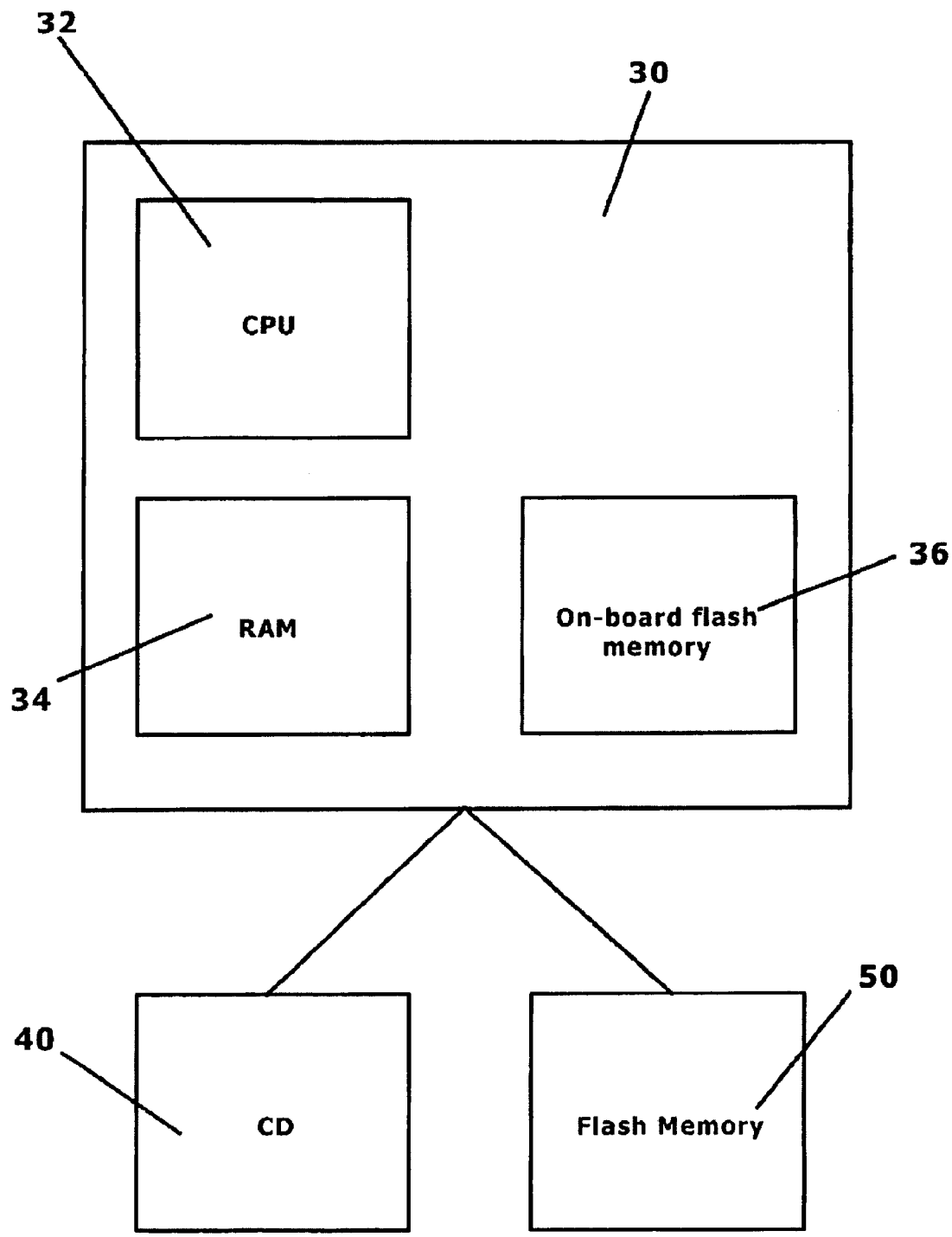
FIG. 4 is a schematic view of the video game terminal.

The video game terminal in a modified operation thereof can be more fully appreciated from FIG. 4. The video game terminal is similar to PENTIUM computer and the processing is indicated by the circuit board 30. This circuit board has the processor 32 which interacts with random access memory 34, as well as a small amount of flash memory indicated as 36. The processing arrangement controls the operation of the video game terminal, including the display of menus on the video screen, and the accessing of games that are typically stored on the CD drive mass storage arrangement 40 and the accessing and storage of select games in flash memory mass storage arrangement 50.

Flash memory has been decreasing in price and has the advantage that the information remains stored if power is disconnected. Similarly, the CD retains the information without power. The flash memory 50 is rewritable and during operation of the game terminal, the games stored in the memory will be added to and deleted from.

The CD drive mass storage arrangement 40 provides a simple way of loading a host of games, certainly more than 20 games and typically 60 or more games to the video game terminal for possible play by the user. The operating system of the video game terminal controlled by the circuit board 30 will display the titles or icons of the individual games and allow the user to select a desired game. This processor also controls the payment function and authorization sequences, etc.

The operating system of the video game terminal monitors the different games and effectively keeps some statistics with respect to game usage. These statistics include determination of the most popular games being played. It has been found that although the video game terminal may include some 60 different games, in most cases, about a third of these games will represent about 80 percent of the games played. It has also been found that the most popular games in one particular location may not be the most popular games in other locations. Obviously, there are a number of factors which determine which games are popular, and this varies with the particular clientele of the location, the game players and other factors which varies in time.

When a game is selected, it or a part thereof, is uploaded to the Random Access Memory 34. This Random Access Memory allows for quick access and fast playing of the game. Once a game is completed, the uploaded game is often maintained in RAM, and in some cases, depending upon the actual size of the RAM, the last played game may still be maintained in RAM. Often some small games which are not memory intensive are uploaded to RAM and maintained therein. For example, some card games are often maintained in RAM.

The flash memory 50, which in this case is preferrably at least 10 megabytes or more, is used for storage of the more popular games, or at least certain portions thereof. For example, if a particular game is played often, the operating system will recognize that this game is popular, and load this game into the flash memory 50. The flash memory provides faster access to the game and reduces the delay time to load the game once a patron has decided to play. Surprisingly, a patron is not particularly tolerant of delays to initiate a game once they have indicated a desire to play and paid the required amount. By storage of the most popular games in the flash memory 50, the delay in initiating the game is significantly reduced.

Only certain portions of the more popular games may be installed in the flash memory. For example, if the game has a number of extensive video or audio files, then only portions of the game may be stored in the flash memory and other portions will remain on the CD. This typically will allow the game to be initiated more quickly and the game can be designed such that the time delay to access intervention from the CD for the audio and/or video files will not affect the play of the game. The portions of the game to be stored in flash memory can be identified on the CD to be recognized by the processor for additional storage in the flash memory.

In other cases, the games may be fairly memory efficient and if it is a popular game, the entire game can be stored in flash memory.

A further feature of the present invention, is that each game terminal will store in the flash memory, the most popular games for that particular terminal. Thus, the games stored in flash memory at one end of the bar, may be different from the games stored in the flash memory at the opposite end of the bar. If through use, they both have the same popular games, then the same games will be stored in flash memory as each operating system will monitor the games played and optimize their memory storage arrangement for more efficient operation.

A further feature of the invention is that on occasion, there could be failure of the CD drive. Although we have referred to a CD drive, this could also be a hard disk drive or a DVD drive. These are mechanical devices which rely on a motor and a rotating memory medium, and thus are subject to failure. In the event of a failure of the mechanical drive, the game processing arrangement recognizes this failure and then determines which games remain available to it, through the use of the flash memory, as well as any games that have been maintained in RAM associated with the processor. The operating system then produces a restricted list of games which are available and displays these games for play by the patrons. It will also provide an indication to the site operator that service is required. This notice could be a flashing icon if the device is a stand alone device, or if it is connected to a telecommunication system, this could include a message sent out to a centre, identifying a particular address and identifying the failure that has occurred.

It is less likely that there could be failure of the flash memory, however, there may be some problems associated with the connection of the flash memory to the processor 30. If this should occur again, this condition is recognized by the operating system of the video game and it can go into a restricted mode relying solely on the CD drive.

The CD drive arrangement and the flash memory arrangement provide a particularly valuable combination. The CD drive allows for convenient updating or installing of new games by CD. The flash memory tends to be more expensive, however, it does provide for redundancy in the event of failure of the CD and also provides improved fast access and less delay in initiating games. It also allows segmenting the games, such that the popular games are more quickly available.

A CD provides excellent mass storage and is preferrable to combine this with 40 mega bytes or more of flash memory. Flash memory per megabyte is more expensive than both CD or hard drive, however, 40 mega bytes does provide improvements in the operation of the game terminal and also can be justified due to the redundancy factor. As can be appreciated, if the CD or hard drive were to fail, the flash memory can continue to operate and many of the most popular games of the game terminal continue to operate.

The flow chart of FIG. 3 shows the sequence of events that occur on power up of the game terminal. Upon power up the operating system of the video game terminal is loaded from the onboard flash memory 36. The operating system then checks to see whether the flash memory 50 is present and working. If it cannot locate this flash memory, then it assumes a flash memory problem and functions based only on the CD mode after checking the CD drive. If the flash memory is present and working, it is then tested to determine whether the flash data is valid. If not, the operating system turns to the CD drive to see if the CD drive is present and is working. The functioning CD drive then upgrades the flash memory by a complete rewriting thereof, from the CD.

If the flash data is valid, then the logic checks to make sure the CD is present and working. If the CD is not working, the games that are not completely stored in flash memory are disabled and the game terminal functions in restricted mode, based on the flash memory alone.

If the CD is present and is functioning, the logic checks to determine whether the version of the CD is the same. Basically a check is made whether an updated CD has been loaded. If an updated CD has been loaded, the flash memory is completely updated and rewritten from the CD. If the CD has not changed, the game terminal starts operation of regular game mode.

The regular game mode looks initially to the flash memory for loading of a game and if it not present, the game resources are loaded from the CD. When the terminal is not being played, it operates in an idle mode. Idle mode typically includes displaying of information on screen to attract potential players as well as administrative procedures. Game statistics are updated and checked and less frequently, played games removed from flash memory, and more frequently, played games added to flash memory.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A coin operated game device comprising a computer processing arrangement, said computer processing arrangement including a computer processor and circuit board having an associated random access memory for running of one of a series of games, a first mass storage device being selected from the group of hard disk drive, compact disk drive with Compact Disk (CD) and Digital Video Disk (DVD) drive and DVD, and a second mass storage device, said second mass storage device being a flash memory device with a capacity of at least 10 mega bytes, said first mass storage device containing said series of games for selection and play on said game device; said computer processor including a game monitoring and storage management function which tracks individual games played and identifies the more popular games played, said game monitoring and storage management function automatically additionally storing or partially storing the identified more popular games played in said flash memory device; said computer processing arrangement upon selection of a game of said identified more popular games played accessing said flash memory device to initiate play of said game; said computer processing arrangement upon selection of a game other than said identified more popular games accessing said first mass storage device to initiate the selected game; said monitoring and storage management function automatically maintaining the more popular games played as a function of the ongoing usage of the coin operated game device.

2. A coin operated game device as claimed in claim 1 having at least 30 games.

3. A coin operated game device as claimed in claim 2 wherein said games on average require at least one megabyte of memory.

4. A coin operated game device comprising a main processing arrangement for playing of any of 10 or more games stored in a separate flash memory arrangement, a mass storage arrangement storing series of at least 20 games including the games stored in said flash memory, said processing arrangement being capable of accessing either said mass storage arrangement or said separate flash memory arrangement for playing of a game, said processing arrangement initiating play of a game stored in flash memory in a shorter period of time relative to said processing arrangement initiating play of the same game stored in said mass storage arrangement; said processing arrangement maintaining statistics with respect to the individual games played to determine popular games and based thereon automatically maintains the determined popular games or parts thereof in said flash memory, said processing arrangement initiating play of a selected game from flash memory if stored therein and if not initiating play from said mass storage arrangement.

5. A coin operated game device as claimed in claim 4 wherein said processing arrangement in the event of failure of either said flash memory or said mass storage arrangement operates said device in a restricted mode based on the remaining operating memory.

6. A coin operated game device as claimed in claim 4 wherein said mass storage arrangement includes a compact disk or a digital video disk and said processing arrangement in the event of failure of said mass storage arrangement operates said device in a restricted mode based on the games available in said flash memory arrangement.

7. A coin operated game device as claimed in claim 6 wherein said processing arrangement disables any games which are not available and only displays available games for selection by a user.

8. A pay to play game device having a large selection of games for possible play on said device, said game device comprising an arrangement for receiving payment and authorizing game play, a main processing arrangement and operating system for accessing any of a series of games stored in a mass storage memory device, at least partially storing in a flash memory storage device some of said series of games stored in said mass storage device, said main processing arrangement accessing said flash memory device at a first rate to allow playing of a selected game at least partially stored in said flash memory device and accessing said mass storage memory device at a second rate to allow playing of a selected game stored in said mass storage memory device where said first rate is faster than said second rate, said main processing arrangement including a tracking program for determining which games stored in said mass storage device are more frequently played games based on usage of said game device and additionally automatically storing said frequently played games or parts thereof in said flash memory storage device for faster access by initiation by said main processing arrangement when one of said more frequently played games is selected for play.

9. A pay to play game device as claimed in claim 8 wherein said main processing arrangement upon authorization of a particular game accesses said flash memory storage device to allow playing of said particular game if said particular game is one of said determined frequently played games.

10. A pay to play game device as claimed in claim 9 wherein said flash memory device includes the storage of complete games.

11. A pay to play game device as claimed in claim 9 wherein said flash memory storage device is of a capacity much less than the storage capacity of said mass storage memory device.

12. A pay to play game device as claimed in claim 8 wherein said flash memory storage device stores up to 10 games to allow more efficient play thereof.

13. A pay to play game device as claimed in claim 12 wherein said mass storage memory device stores at least 60 games.

14. A pay to play game device as claimed in claim 13 wherein said mass storage memory device is compact disk device or is a digital video disk device.

15. A pay to play game device as claimed in claim 8 wherein said operating system in the event of failure of said flash memory storage device operates said game device using said mass memory storage device.

16. A pay to play game device as claimed in claim 8 wherein said operating system in the event of failure of said mass storage memory device operates said game device in a restricted mode using only said games stored in said flash memory storage device.

17. A coin operated game device as claimed in claim 16 wherein said processing arrangement and operating system disables any games which are not available and only displays available games for selection by a user.

* * * * *